United States Patent
Simpson et al.

[11] Patent Number: 5,982,320
[45] Date of Patent: Nov. 9, 1999

[54] RADAR SEEKER

[75] Inventors: Hilary Jane Simpson, Croxley Green; Martin Robert Winstone, Watford, both of United Kingdom

[73] Assignee: The Marconi Company Limited, United Kingdom

[21] Appl. No.: 07/163,569

[22] Filed: Jan. 27, 1988

[51] Int. Cl.⁶ .................................................. G01S 13/00
[52] U.S. Cl. ............................................................ 342/151
[58] Field of Search .................................. 342/149–151

[56] References Cited

U.S. PATENT DOCUMENTS

| | | | |
|---|---|---|---|
| 3,560,974 | 2/1971 | Lecourtier et al. | 343/16 M |
| 3,680,102 | 7/1972 | Poinsard | 343/16 M |
| 3,710,390 | 1/1973 | Kreinheder | 343/16 M |
| 3,713,155 | 1/1973 | Jaffe | 343/16 M |
| 3,714,652 | 1/1973 | Grabowski et al. | 343/16 M |
| 3,766,556 | 10/1973 | Amoroso, Jr. | 343/16 R |
| 3,977,000 | 8/1976 | Wagner | 343/16 |

OTHER PUBLICATIONS

Thomson, D.: "Monopulse design for tactical tracking radar", Microwave Journal, May 1985, vol. 28, No. 5, pp. 307–310.

*Primary Examiner*—Mark Hellner
*Attorney, Agent, or Firm*—Kirschstein, et al.

[57] ABSTRACT

A radar seeker employing a 4-element antenna and amplitude or phase comparison target location. The azimuth (C and D) and elevation (A and B) elements share two channels alternately by means of cycling switches (S1, S2). Sum (31) and difference (29) signals are derived from the two channels and then the difference channel is re-distributed (S4) to dedicated azimuth and elevation channels. The shared channels (G, H) are interchanged cyclically (S3) so that mismatches between them are cancelled out.

7 Claims, 2 Drawing Sheets

RADAR SEEKER

BACKGROUND OF THE INVENTION

This invention relates to a radar seeker of the kind employing an array of antenna elements disposed about the boresight in such manner that difference signals between the elements can be obtained in two coordinate planes, usually the elevation and azimuth planes. Such a difference signal, together with a sum signal derived from all of the elements, provides a measure of the target angle off-boresight in known manner. The difference signal may be the difference between the individual amplitudes, in an amplitude comparison system using antenna elements toe'd out from the boresight, or may be the instantaneous difference, in a phase comparison system using antenna elements directed parallel to the boresight.

FIG. 1 shows a typical prior art antenna array with elements A, B, C and D arranged in a diamond formation, i.e. a square with horizontal and vertical diagonals. An elevation difference is then provided by a difference signal A–B and an azimuth difference by a difference signal C–D. In an alternative arrangement the square may be upright and the element signals added and subtracted in pairs.

FIG. 2 shows the basic components of a prior art amplitude comparison system, i.e. four elements A, B, C and D, a receiver in each element channel comprising a frequency mixer to 'down-convert' the radar frequency to an intermediate frequency and an envelope detector. The A and B receiver channels are applied to a differencing circuit 11 and the C and D receiver channels similarly to a differencing circuit 13. Thus elevation and azimuth difference signals are produced. A summing circuit 15 derives the sum of all of the signals, this sum being used as a reference for the difference signals in a processor 17 which calculates the target azimuth and elevation angles and provides tracking and missile steering signals accordingly.

FIG. 3 shows a similar prior art arrangement but of a phase comparison system. Intermediate frequency signals are derived by 'down-converters' 19 but the phase is left intact for application to phase-sensitive detectors 21 and 23 which produce a signal proportional to the cosine of the phase difference. A sum signal is provided by a summing circuit 25 as before, now followed by an envelope detector 27. The sum and difference signals are then processed by processor 17 as before.

A difficulty arises in the above arrangements in that considerable processing of the individual antenna signals occurs in separate channels which may not be perfectly matched in gain or phase or both. Angle determination errors consequently arise.

SUMMARY OF THE INVENTION

An object of the present invention is to avoid such mismatch errors as far as possible.

According to the present invention, in a radar seeker comprising an antenna array, sum and difference channels and processing means responsive to sum and difference signals to provide an indication of target angle off the antenna boresight, a single pair of channels are time-shared by two combinations of antenna elements, each combination providing sum and difference signals in respect of a corresponding coordinate plane, the seeker further comprising means for interchanging the antenna output signals cyclically between the two channels so that the difference signal changes sign cyclically, means for inverting the difference signal in synchronism with the interchanging of antenna output signals, and means for combining successive inverted and non-inverted difference signals, the arrangement being such as to balance out mismatch between the two channels. There are preferably time-sharing switch means connected between the antenna array and the inputs of the two channels and second time-sharing switch means arranged to share the difference signals between two difference channels dedicated to the respective coordinate planes.

The antenna array may be arranged for amplitude comparison of element signals, the two channels each comprising a frequency down-converter and signal detection means, and the detected signals being applied to amplitude differencing means to provide a time-shared difference channel.

Alternatively, the antenna array may be arranged for phase comparison of element signals, the two channels each comprising a frequency down-converter and a phase-sensitive detector and the output of which providing a time-shared difference channel.

BRIEF DESCRIPTION OF THE DRAWINGS

A radar seeker in accordance with the invention will now be described, by way of example, with reference to the accompanying drawings, of which.

DETAILED DESCRIPTION OF THE PREFERRED EMBODIMENT

Figure 1:
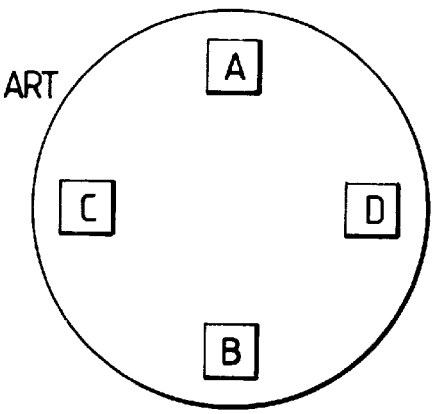
FIG. 1 is a diagram of an antenna array according to the prior art.
Figure 2:
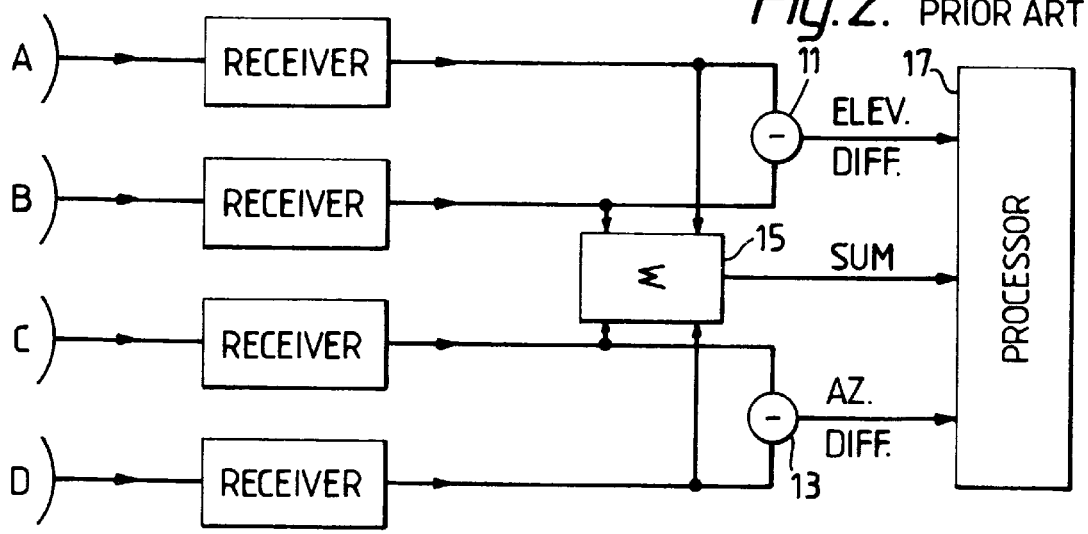
FIGS. 2 and 3 are diagrammatic circuits of the basic components of known amplitude and phase comparison seekers respectively according to the prior art.
Figure 3:
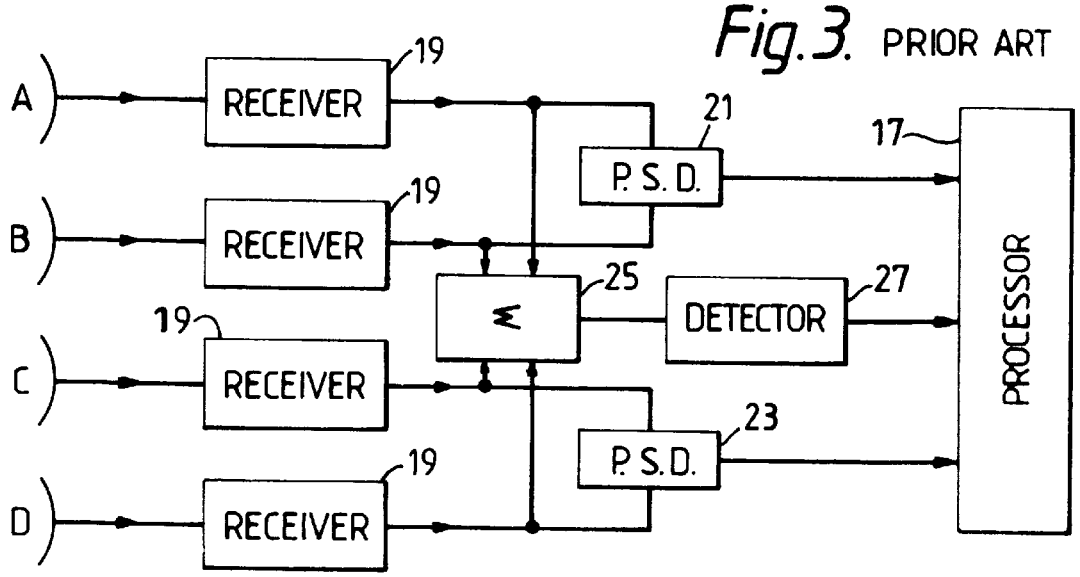

FIGS. 1, 2 and 3 have been described above.

Figure 4:
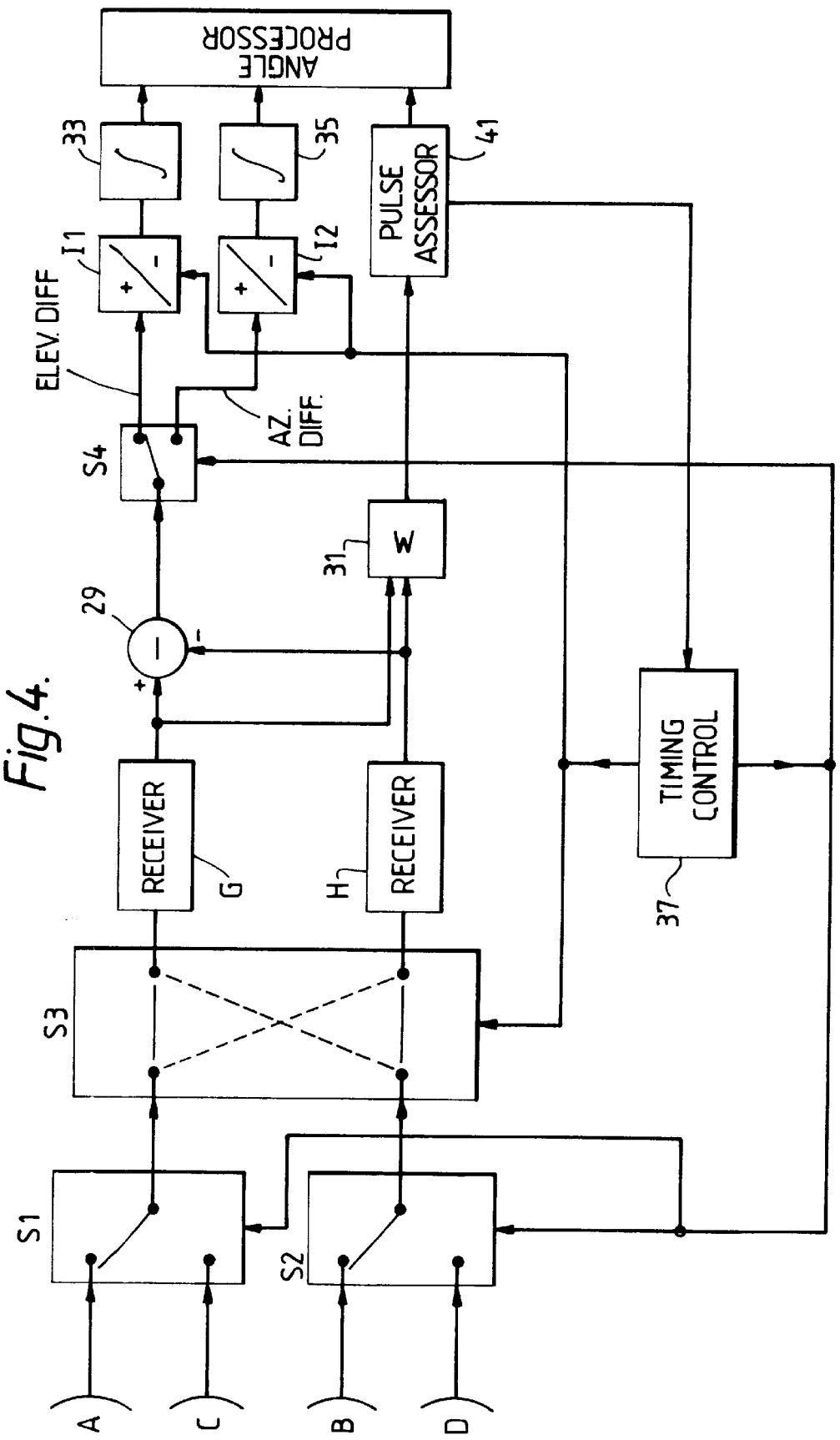
FIG. 4 is a diagram of an amplitude comparison seeker modified in accordance with the invention.

FIG. 4 shows the four antenna elements A, B, C and D coupled in un-related pairs as it were. Thus elements A and C are connected to a changeover switch S1 whose output is fed to, what is in effect, a double-pole-double-throw switch S3. The second input switch S3 is similarly derived from a changeover switch S2 and the two antenna elements B and D. It will be appreciated that the various switches shown as mechanical devices for simplicity are in fact solid state devices.

The switches S1 and S2 are cycled, as will be explained, so as to time-share their output, and the following receiver channel, between their two inputs. Switch S3 is similarly cycled, thus interchanging the receiver channels G and H periodically. These include down-converters and detectors as in FIG. 1. The two channel signals are then subtracted in a differencing circuit 29 and summed in a summing circuit 31.

The shared difference channel is connected to a further time-sharing switch S4 which is operated cyclically in synchronism with the switches S1 and S2, so sharing the difference signal between two dedicated difference channels which, as will be seen, are the elevation and azimuth difference channels.

The switch S3 is linked to two inverters I1 and I2 in the elevation and azimuth difference channels respectively, which are controlled, in synchronism with the switch S3 to invert and not invert the respective difference signal alternately.

The seeker has an application in an anti-radar system, i.e. in which the target, which may itself be a missile system, is defended or controlled by a radar system which in general will transmit radar pulses to the attacking missile.

There are several possible operating modes. In the first, all switching is performed between successive (received) radar pulses. If, on receipt of a first pulse, the switches S1, S2 and S4 are as shown and the switch S3 is in the 'straight-through' condition a difference signal A–B for the elevation plane is obtained at the output of the differencing circuit 29 indicating a target elevation angle of, say, $\theta$. If there is a mismatch between the receiver channels feeding the differencing circuit there will be an angle error of, say $\phi$, giving an actual indication at the difference output of $\theta+\phi$. If, on the following received pulse the switches S1 and S2 are unchanged, but the switch S3 is reversed, the error in the receiver channels will remain as $+\phi$ but the antenna element signals will be reversed, i.e. B–A. The difference output will then be $-\theta+\phi$. The inverter I1 is, however, operated in synchronism with the switch S3 and, with the switch S4 as shown for both pulses the elevation difference signal will be $\theta+\phi$ for the first pulse and $+\theta-\phi$ for the second. An integrator 33 provides an average of the two values and hence eleminates the error $\phi$.

The switches S1, S2 and S4 then operate and for the next two pulses the azimuth plane signals C and D are processed giving $\psi+\phi$ and $\psi-\phi$ at the output of inverter I2. The integrator 35 averages the two values and again eliminates the error. This process then repeats, the switch S3 and inverters I1 and I2 changing over after every pulse and the switches S1, S2 and S4 after every other pulse.

In an alternative mode switches S1, S2 and S4 change during each pulse so that each pulse provides angle information in both planes. The switch S3 may then change after every pulse so requiring two pulses to provide error compensation.

Again, switches S1, S2 and S4 may be switched after every pulse and switch S3 during each pulse. Error compensation is thus provided over one pulse but two plane measurements require two pulses.

In a fourth alternative both plane switching and compensation switching are performed once during each pulse.

The switch operation timing is controlled by timing circuitry 37 which is supplied with pulse arrival information from a processor 41 which assesses potential target pulses and determines the timing of the confirmed pulses.

The phase comparison arrangement is basically similar, differing only (as between FIGS. 2 and 3) in the use of a phase sensitive detector instead of a differencing circuit.

We claim:

1. A radar seeker comprising an antenna array having a boresight and a plurality of antenna elements spaced about said boresight, a pair of channels connected to two combinations of said antenna elements selectively, each of said channels including a respective receiver which comprises frequency shifting means and a detector for providing an envelope signal, each combination providing respective envelope signals for summing and differencing in a respective coordinate target plane, sum and difference means connected to said pair of channels providing the sum and difference of the channel envelope signals, switching means for interchanging the inputs to said channels cyclically so that the difference signal changes sign cyclically, means for inverting the difference signal in synchronism with the operation of said switching means, to provide inverted and non-inverted difference signals alternately, and means for combining said inverted and non-inverted difference signals to balance out mismatch between said two channels.

2. A radar seeker according to claim 1 comprising first time-sharing switch means for connecting said two combinations of antenna elements to the inputs of said two channels and second time-sharing switch means arranged to share said difference signals between two difference channels dedicated to the respective coordinate target planes.

3. A radar seeker according to claim 2, wherein said means for inverting the difference signal is in respect of each of said two difference channels.

4. A radar seeker according to claim 2, wherein said means for inverting the difference signal is a single means connected to the output of said difference means.

5. A radar seeker according to claim 1, wherein said antenna array comprises four elements in a diamond array, each of said combinations comprising a diametrically opposed pair of elements.

6. A radar seeker according to claim 1, wherein said antenna array is arranged for amplitude comparison of element signals and said two channels each comprise a frequency down-converter and signal detection means, the detected signals being applied to amplitude differencing means to provide a time-shared difference channel.

7. A radar seeker according to claim 1, wherein said antenna array is arranged for phase comparison of element signals and said two channels each comprise a frequency down-converter and a phase-sensitive detector, the output of said phase-sensitive detector providing a time-shared difference channel.

* * * * *